United States Patent
Vanderwilt et al.

(10) Patent No.: US 6,693,661 B1
(45) Date of Patent: Feb. 17, 2004

(54) CONFERENCING SYSTEM HAVING AN EMBEDDED WEB SERVER, AND METHOD OF USE THEREOF

(75) Inventors: Patrick Vanderwilt, Austin, TX (US); Michael Kenoyer, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 0 days.

(21) Appl. No.: 09/417,903

(22) Filed: Oct. 14, 1999

Related U.S. Application Data

(60) Provisional application No. 60/104,264, filed on Oct. 14, 1998.

(51) Int. Cl.[7] .................................................. H04N 7/14
(52) U.S. Cl. ............................... 348/14.01; 348/14.03; 709/203; 709/204
(58) Field of Search ........................... 348/14.01–14.03, 348/14.05, 14.07–14.11; 370/260–263, 400–401; 345/700, 751, 753; 709/203–204, 218–219, 224; 379/93.14

(56) References Cited

U.S. PATENT DOCUMENTS

| | | | |
|---|---|---|---|
| 5,617,539 A | * 4/1997 | Ludwig et al. | ............. 345/753 |
| 5,838,682 A | * 11/1998 | Dekelbaum et al. | ........ 370/401 |
| 5,867,494 A | 2/1999 | Krishnaswamy | |
| 5,916,302 A | 6/1999 | Dunn | |
| 5,923,736 A | 7/1999 | Shachar | |
| 5,956,487 A | * 9/1999 | Venkatraman et al. | ...... 709/218 |
| 5,968,119 A | * 10/1999 | Stedman et al. | ............ 709/219 |
| 5,995,608 A | 11/1999 | Detampel | |
| 5,999,525 A | 12/1999 | Krishnaswamy | |
| 6,028,917 A | 2/2000 | Creamer | |
| 6,091,808 A | 7/2000 | Wood | |
| 6,094,659 A | * 7/2000 | Bhatia | ..................... 379/93.14 |
| 6,108,687 A | * 8/2000 | Craig | ............................. 707/1 |
| 6,122,665 A | * 9/2000 | Bar et al. | .................... 709/224 |
| 6,130,933 A | 10/2000 | Miloslavsky | |
| 6,144,667 A | 11/2000 | Doshi | |
| 6,144,991 A | 11/2000 | England | |
| 6,151,619 A | 11/2000 | Riddle | |
| 6,175,854 B1 | 1/2001 | Bretscher | |
| 6,177,932 B1 | 1/2001 | Galdes | |
| 6,182,073 B1 | * 1/2001 | Kukkal | ....................... 709/204 |

(List continued on next page.)

OTHER PUBLICATIONS

Ellen A. Isaacs, John C. Tang and Trevor Morris, "Piazza: a Desktop Environment Supporting Impromptu and Planned Interactions", Proceedings of the ACM 1996 Conference on Computer Supported Cooperative Work, Nov. 1996, pp. 16–20, SunSoft, Mountain View, CA.

Marita Duecker, Wolfgang Mueller, Jessical Rubart, "VIPspace– A Visually Programmable Shared Workspace", Visual Languages Proceeding. Sep. 1998, pp. 94–95, C–Lab Paderborn Germany.

Tohio Souya, Makoto Kobayashi, Satoshi Kawase, and Katsumi Ohshima, "Joint Class Experiments Based on Real-time We–Browser Synchronization", Computer Human Interaction Proceeding, 3rd Asia Pacific, Jul. 1998, pp. 367–372, IBM Japan Ltd. Tokyo Japan.

*Primary Examiner*—George Eng
(74) *Attorney, Agent, or Firm*—Wong, Cubello, Lutsch, Rutherford & Brucculeri, LLP

(57) ABSTRACT

A videoconferencing system includes an embedded web server and a network interface for connecting the videoconferencing systems to a network. Computers and other devices on the network may manage and control various operations of the videoconferencing system through a conventional browser interface by accessing web pages transmitted by the embedded web server. In addition, users of network-connected computers may upload presentation files to the videoconferencing system to enable transmission of presentation slides to remote conference endpoints. The videoconferencing system may also be provided with an integrated network hub to allow connection of the videoconferencing system to one or more local computers.

21 Claims, 9 Drawing Sheets

U.S. PATENT DOCUMENTS

| | | |
|---|---|---|
| 6,188,676 B1 | 2/2001 | Pirich |
| 6,195,694 B1 * | 2/2001 | Chen et al. .................. 709/203 |
| 6,198,739 B1 | 3/2001 | Neyman |
| 6,215,790 B1 | 4/2001 | Voit |
| 6,222,826 B1 | 4/2001 | Faynberg |
| 6,226,669 B1 | 5/2001 | Huang et al. |
| 6,259,449 B1 | 7/2001 | Saxena |
| 6,295,551 B1 * | 9/2001 | Roberts et al. .............. 709/203 |
| 6,317,777 B1 * | 11/2001 | Skarbo et al. .............. 709/203 |
| 6,373,841 B1 * | 4/2002 | Goh et al. .................. 370/389 |

* cited by examiner

CONFERENCING SYSTEM HAVING AN EMBEDDED WEB SERVER, AND METHOD OF USE THEREOF

CROSS-REFERENCE TO RELATED APPLICATIONS

This application claims the benefit of commonly owned U.S. Provisional Patent Application No. 60/104,264 entitled "Conferencing System Having Integrated Network Concentrator and Embedded Server, and Methods of Use Thereof", filed on Oct. 14, 1998. This application is also related to commonly owned U.S. Provisional Patent Application No. 60/089,011, entitled "Videoconferencing System with Integrated Network Server", filed on Aug. 18, 1998 and now abandoned. The foregoing applications are incorporated by reference.

BACKGROUND

1. Field of the Invention

The present invention relates generally to telecommunications systems, and more particularly to a web-enabled videoconferencing system.

2. Description of the Background Art

Conferencing systems, which enable real-time communication between persons or groups of persons located remotely from each other, are becoming progressively widely utilized in commercial settings. In particular, many businesses (especially those having geographically dispersed operations) employ videoconferencing systems to facilitate group discussions or presentations and thereby avoid requiring all of the participants to travel to a central location. Such videoconferencing systems may additionally permit sharing of data, such as slides or other audiovisual content.

It is often desirable to connect communications devices to existing computer networks, such as local area networks (LANs). LANs advantageously enable sharing of files and applications between network devices (such as PCs) and also facilitate common use of peripheral devices, such as printers or modems. Further, utilization of LANs enables centralized remote management of network devices by a system administrator.

Despite the inherent benefits of doing so, prior art conferencing systems have offered no or limited network connectivity. Of those conferencing systems capable of connecting to a LAN, many require expensive and difficult-to-configure add-on network interface hardware. An additional drawback associated with prior art conferencing systems capable of being coupled to a LAN is their lack of a standardized and familiar interface. Persons wishing to communicate with a conferencing system via the LAN install special software and acquaint themselves with proprietary, non-intuitive interfaces developed by the conferencing system manufacturer. Such interfaces may not necessarily be compatible with other devices connected to the LAN.

In view of the foregoing discussion, there exists a need for a conferencing system which can be easily coupled to a LAN. There is a further need for a conferencing system which facilitates communication therewith via the LAN by utilizing a standard, well-known interface.

SUMMARY OF THE INVENTION

The present invention generally comprises a conferencing system having an embedded web server. The web server may be advantageously utilized to retrieve, view and transmit slide presentations, and to remotely manage the associated conferencing system.

In a preferred embodiment of the invention, the conferencing system comprises a videoconferencing unit (VCU) configured to transmit images and speech of near conference participants to a remote conferencing device, and to receive images and speech of remote conference participants for presentation to the near conference participants. The VCU is provided with a multi-port network concentrator, such as an Ethernet hub, allowing the VCU and at least one additional device (typically a personal computer) to be connected to a LAN via a single physical connection. The VCU is additionally provided with a network interface coupled to the network concentrator to enable communication between the VCU and other devices coupled to the LAN.

The embedded web server is conventionally operative to serve web pages responsive to requests received from remote network devices over the LAN. In accordance with preferred embodiments of the invention, the web pages include scripts or applets for selecting slide presentations for subsequent transmission by the VCU, for viewing slide presentations being transmitted by the VCU during a conference, and for performing remote management operations such as configuration and troubleshooting of the VCU, as well as call set-up. A user at a network device accesses the web pages by pointing a conventional browser to a URL uniquely identifying the VCU. The VCU's web server responsively transmits a web page setting forth various VCU-related options available to the user, such as viewing a presentation, selecting a presentation for transmission by the VCU, and performing remote management tasks. Upon selection of a link corresponding to the desired option, the web server transmits a web page having a script or applet for effecting certain operations corresponding to the desired option. For example, the web page associated with the "presentation selection" option may include routines for generating a window enabling the user to identify a presentation (typically residing in the memory of the requesting remote network device) for transmission by the VCU, and for sending the identified presentation to the VCU over the LAN.

By utilizing an embedded web server, the videoconferencing system of the present invention advantageously allows users of remote network devices to easily communicate with the VCU through a well-known, familiar interface. Further, connection of the VCU to the network permits access to conference information by network device users, and allows conference participants to transmit and view presentations stored on network-connected computers. Finally, connection of the VCU to the network facilitates remote management of the VCU by a system administrator.

BRIEF DESCRIPTIONS OF THE FIGURES

DETAILED DESCRIPTION OF PREFERRED EMBODIMENTS

Figure 1:
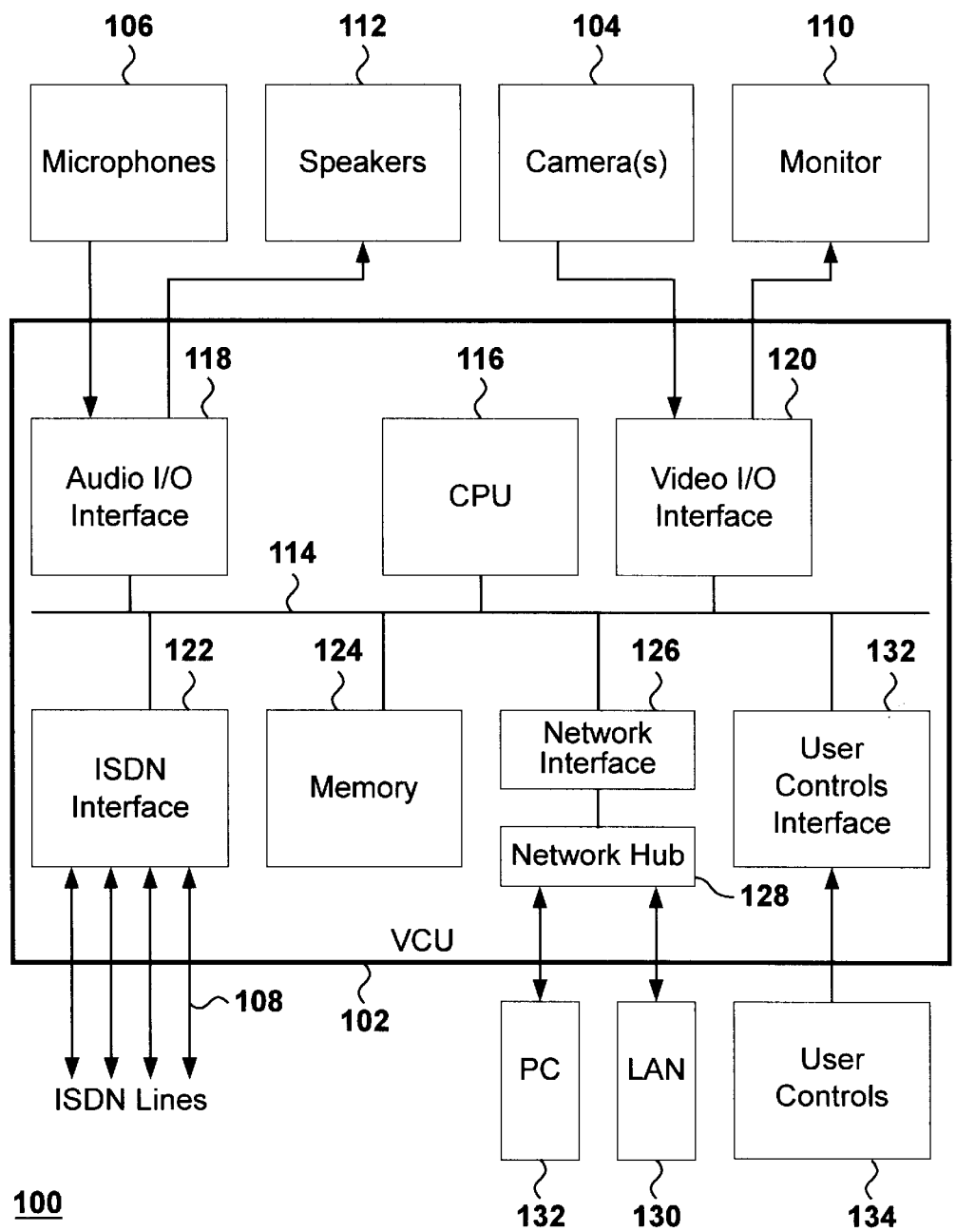
FIG. 1 is a block diagram of a videoconferencing system of the present invention.

FIG. 1 is a block diagram of a videoconferencing system 100 according to the present invention. The videoconferencing system 100 includes a videoconferencing unit (hereinafter "VCU") 102 which receives input from and transmits output to a variety of peripheral devices, and additionally communicates with other devices, including remote conference endpoints and computers, via private or public networks. VCU 102 acquires video and audio information (typically representative of the images and speech of the near conferencing participants) respectively generated by at least one camera 104 and microphones 106. VCU 102 processes the acquired video and audio information, and transmits the processed information to at least one remote conference endpoint connected to VCU 102 via ISDN lines 108.

VCU 102 simultaneously receives video and audio information (typically representative of the images and speech of the remote conference participants) from the remote conference endpoint. The received video and audio information is processed by VCU 102 and the processed video and audio information is directed to a video monitor 110 and speakers 112 so as to present to the near conference participants the images and speech of the remote conference participants. The VCU 102 may also receive input from or direct output to other peripheral devices, such as a videocassette player/recorder, document camera or LCD projector.

Incorporated within VCU 102 are a set of internal electronic components interconnected for communication by at least one bus 114. The internal components include a central processing unit (CPU) 116, an audio input/output interface 118, a video input/output interface 120, an ISDN interface 122, a memory 124, a network interface 126, a network hub 128, and a user controls interface 132. CPU 116 interprets and executes program instructions loaded from memory 124. Audio input/output interface 118 performs analog-to-digital and digital-to-analog conversion and performs other signal processing tasks in connection with audio information received from microphones 106 and sent to speakers 112. Similarly, video input/output interface converts and processes video information received from camera 104 and sent to video monitor 110.

ISDN interface 122 applies well-known processing operations (such as inverse multiplexing) to audio and video data received or transmitted over ISDN lines 108. ISDN interface may include a set of ports for physically and electrically connecting ISDN lines 108 to VCU 102. Memory 124, which may variously include volatile RAM, non-volatile ROM, and/or storage devices such as magnetic disk drives or CD-ROMS, stores executable programs, data files and other information. The contents of memory 124 will be discussed below in connection with FIG. 2.

Network interface 126 and network hub 128 enable connection of VCU 102 to a local area network (LAN) 130. Network interface 126, which may comprise a conventional Ethernet card, mediates between VCU 102 and the physical connection to LAN 130 in accordance with predetermined protocols. Network interface 126 is preferably connected to the internal port of network hub 128. Network hub 128 preferably comprises an Ethernet hub, but may alternatively comprise any network concentrator which physically or logically interconnects network devices.

Network hub 128 is provided with a plurality of external ports enabling connection thereof to LAN 130 and to at least one local network device, such as local personal computer (PC) 132. While two external ports are shown in FIG. 1, those skilled in the art will recognize that network hub 128 may be provided with a greater number of external ports to enable connection to additional network devices. Electrical connection of network hub 128 to LAN 130 and local PC 132 will typically be accomplished using unshielded twisted pair or (thin or thick) coaxial cable. Network hub 128 may also be provided with conventional status indicators for presenting a visual indication to the user of the connection status of VCU 102 and PC 132 for diagnostic or monitoring purposes.

User controls interface 132 enables entry of user input from a local conference participant by receiving and processing signals received from user controls 134. According to one implementation of the invention, user controls 134 includes a conventional wireless remote control device having a set of keys engageable by the user. The keys may include numeric keys, directional arrows, volume and camera position adjustment keys, a menu key, and a slideshow key for initiating transmission of slideshow images to the remote conference endpoint. Engagement of keys causes a corresponding infrared or radio frequency code to be sent to user controls interface 132. User controls interface 132 is thus operative to receive and interpret the codes for further processing by other components of VCU 102. Entry of user input, such as telephone numbers or configuration information, is advantageously accomplished through use of a graphical user interface (GUI), displayed on monitor 110, which prompts the user for specified information.

Figure 2:
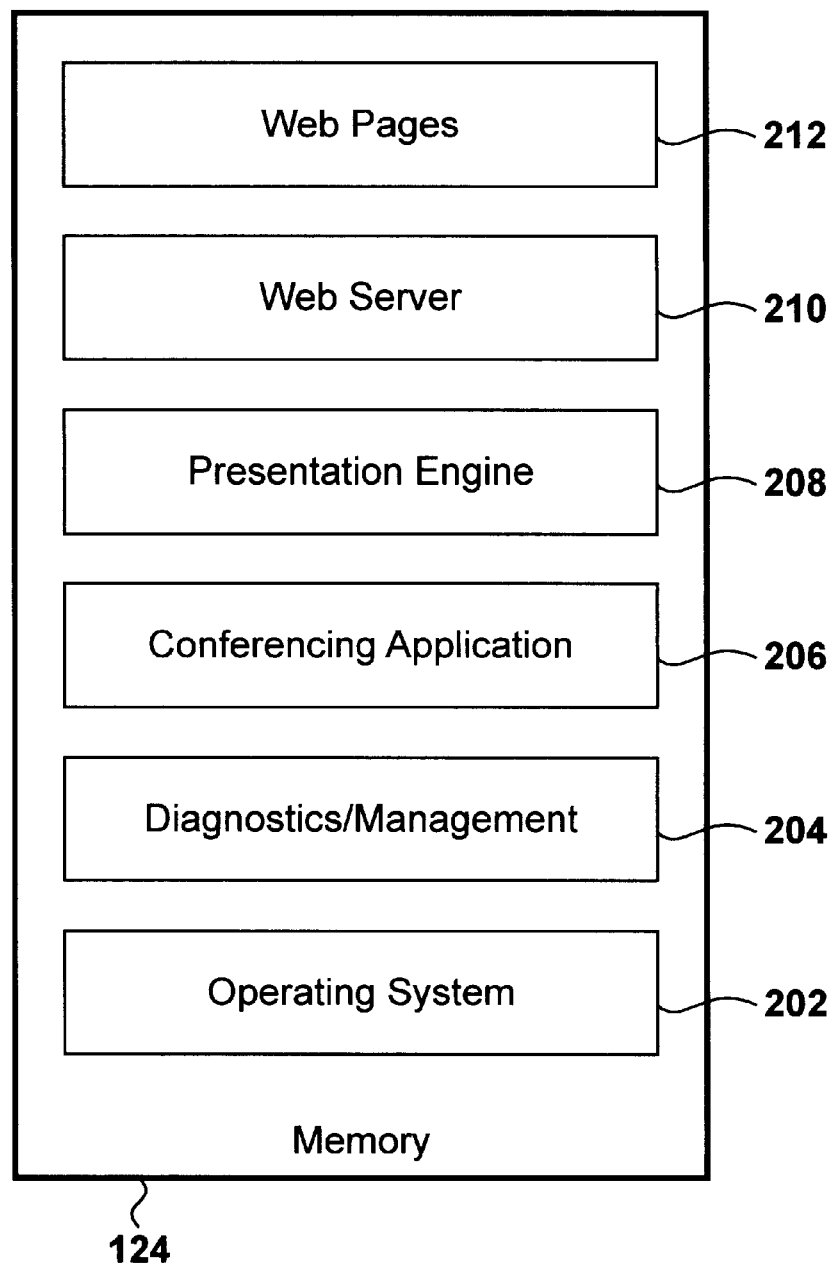
FIG. 2 is a block diagram showing contents of a memory of the FIG. 1 videoconferencing system.

FIG. 2 is a block diagram showing various programs and files stored within memory 124. Contents of memory 124 include operation system (OS) 202, diagnostics/management module 204, conferencing application 206, presentation engine 208, web server 210, and web pages 212. OS 202 controls the allocation and usage of hardware resources such as CPU 116 and memory 124. Diagnostic/management module 204 is configured to perform diagnostic tests of VCU 102, determine and adjust VCU 102 configuration parameters, and conduct various other system management tasks. Conferencing application 206 performs encoding/decoding, multiplexing/demultiplexing, signaling, error checking and related operations in connection with the communication of audio and video data streams between VCU 102 and one or more remote conference endpoints. Presentation engine 208 is operative to convert presentation slides encoded in a first format (such as slides created using the Microsoft Powerpoint application) to a second format suitable for transmission to remote conference endpoints. Presentation engine 208 is further operative to enable user selection of individual slides (from a collection of slides) for transmission to remote conference endpoints, and to transmit selected slides to PCs or other devices accessing VCU 102 through LAN 130 (the process of which will be described in further detail below).

Web server 210 comprises conventional server software for transmitting web pages 212 in response to requests received from remote PCs or other devices over LAN 130 (or from local PC 132). Web servers are well known in the art and hence will not be discussed in detail herein. Web pages 212 are typically encoded using hypertext markup language (HTML) and may contain images, text, sound or program instructions embodied in applets or scripts. Examples of the content of individual web pages 212 are discussed below in connection with FIGS. 4–6.

Figure 3:
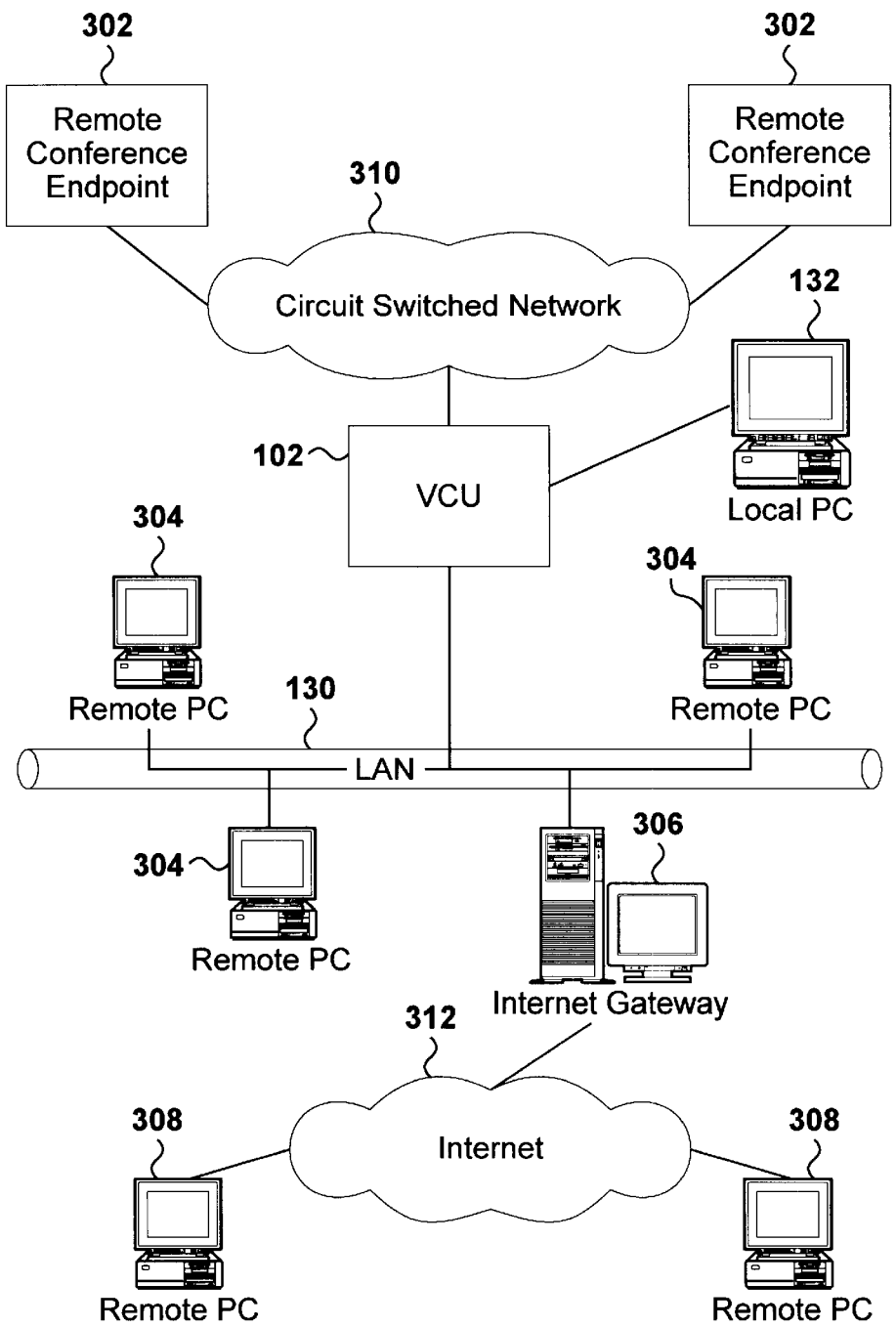
FIG. 3 is a network diagram depicting in particular the interconnection of the videoconferencing system with remote conference endpoints and network devices.

FIG. 3 is a network diagram depicting an exemplary operating environment of VCU 102. Generally, VCU 102 communicates with remote conference endpoints 302 over a circuit switched network 310, and with remote PCs 304 and 308 over LAN 130 and (optionally) over Internet 312. Remote conference endpoints 302 may comprise, for example, videoconferencing systems capable of generating and receiving both video and audio data. Alternatively, one or more remote conference endpoints 302 may comprise audio conferencing devices limited to communication of audio data only. Video and audio data is transmitted between or among VCU 102 and remote conference endpoints 302 over circuit switched network 310, which may comprise the public switched telephone network (PSTN). As discussed above, VCU 102 is connected to circuit switched network 310 via ISDN interface 122 and ISDN lines 108. A multipoint control unit (MCU) or video bridge (not shown) may be coupled to circuit switched network 310 and used to combine and distribute video and audio data for multipoint conferences.

LAN 130, to which VCU 102 is connected via network interface 126 and network hub 128, will typically be an Ethernet network, but may alternatively comprise any suitable packet switched network of arbitrary topology and size. Remote PCs 304 are located at nodes of LAN 130. Other network-enabled devices may also be connected to LAN 130. An Internet gateway 306 (or alternatively a router or bridge), coupled to LAN 130, allows communication between LAN-connected computers and devices (such as VCU 102 and remote PCs 304) and computers or devices (such as remote PCs 308) connected to Internet 312.

As is known in the network art, each computer or device connected to LAN 130 is assigned a unique IP address. Assignment of addresses may typically be performed by a dynamic host configuration protocol (DHCP) server located on LAN 130. Certain LAN connected devices may also be given unique domain names by a system administrator to allow easier identification thereof. For example, VCU 102 may be given the domain name "vcu1.companyname.com". Name/address resolution is implemented by a domain name server located on LAN 130.

Remote PCs 304 and 308 comprise conventional personal computers or similar devices capable of executing a web browser, such as Internet Explorer or Netscape Navigator. As will be discussed in greater detail below, users of remote PCs are able to perform various functions in connection with VCU 102 by pointing a browser to the URL corresponding to web server 210 of VCU 102.

Figure 4:
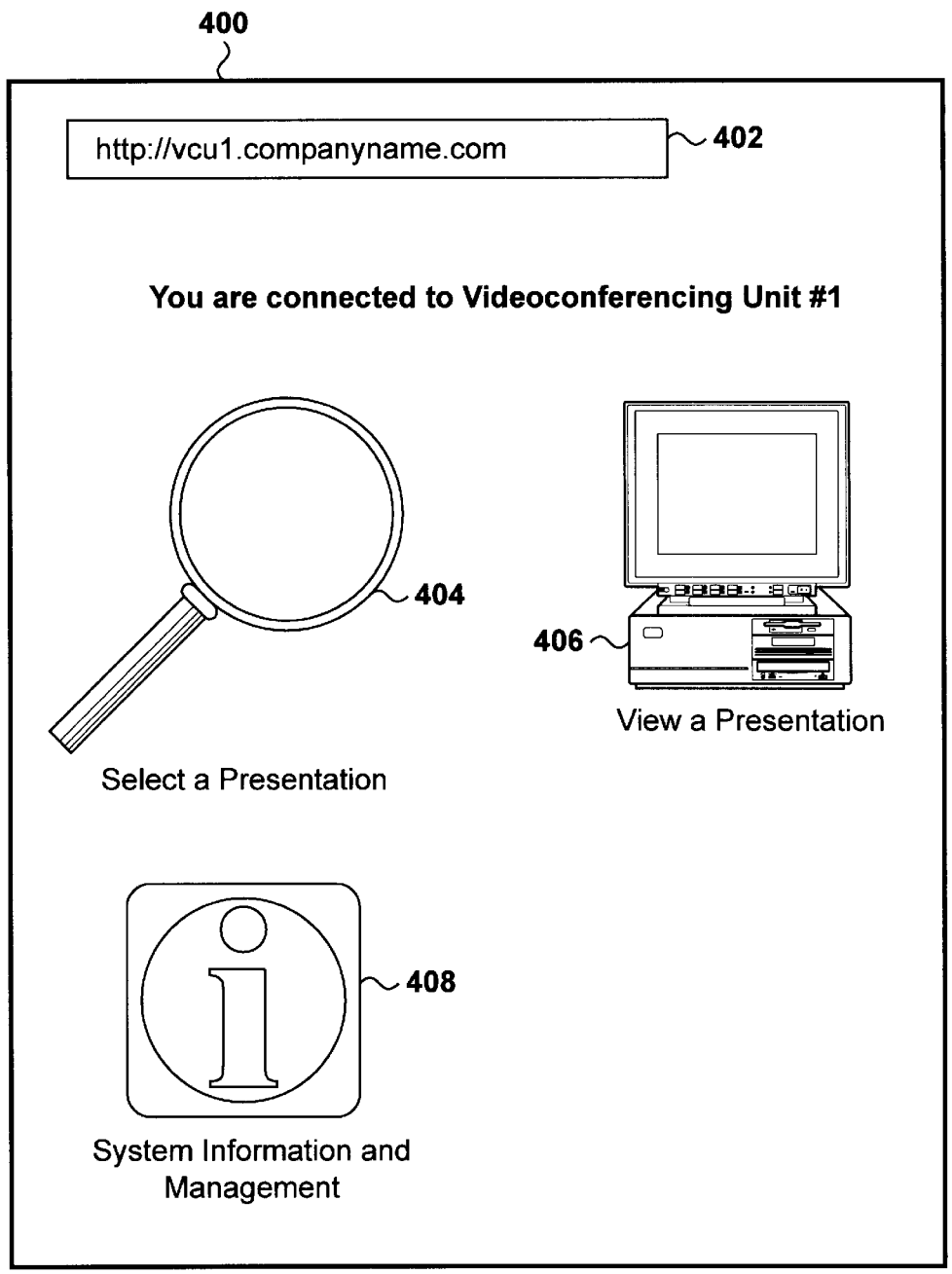
FIG. 4 is an exemplary home page transmitted by an embedded web server of the videoconferencing system.
Figure 5:
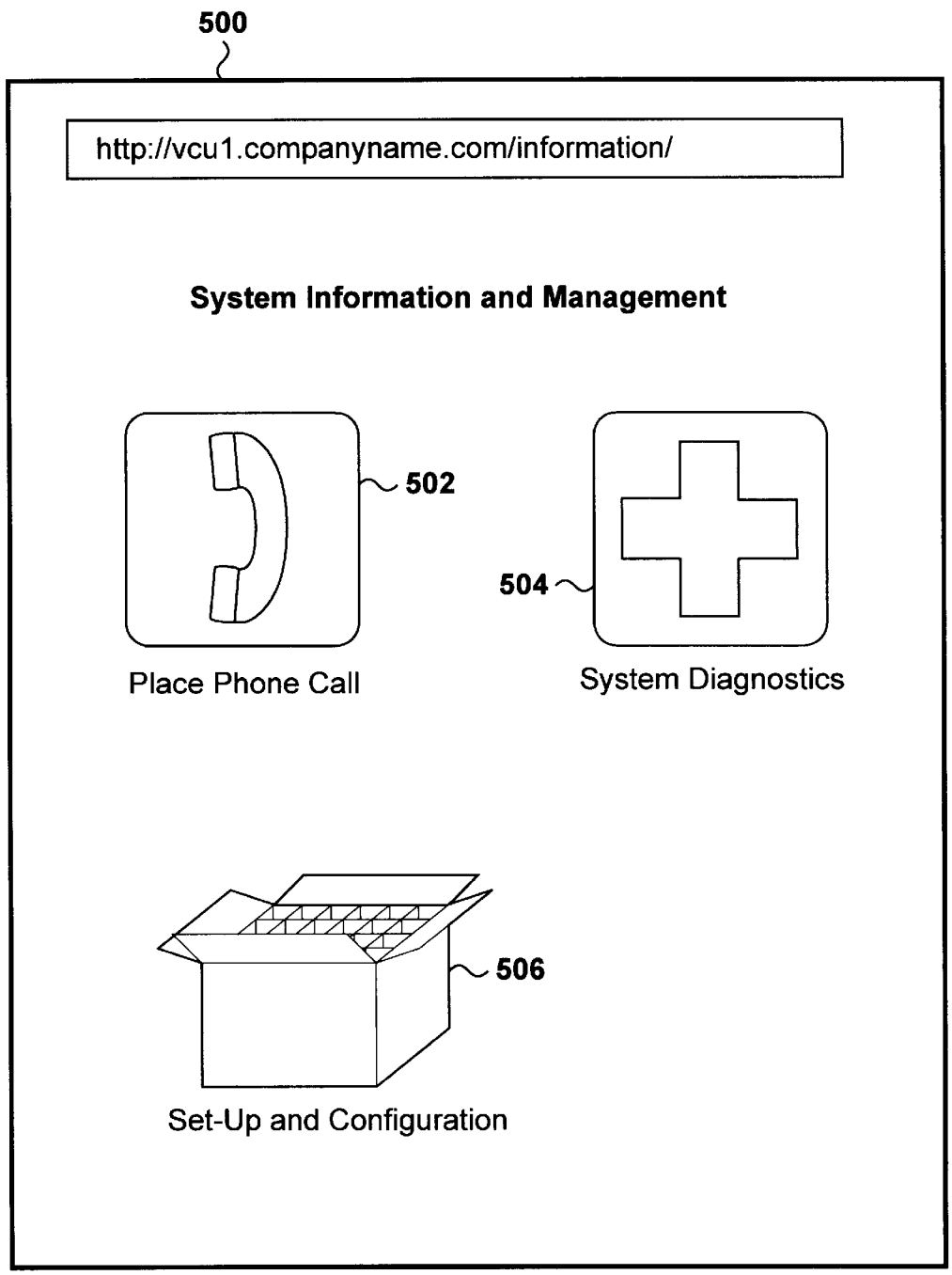
FIG. 5 is an exemplary web.page displaying options for performing remote management tasks.
Figure 6:
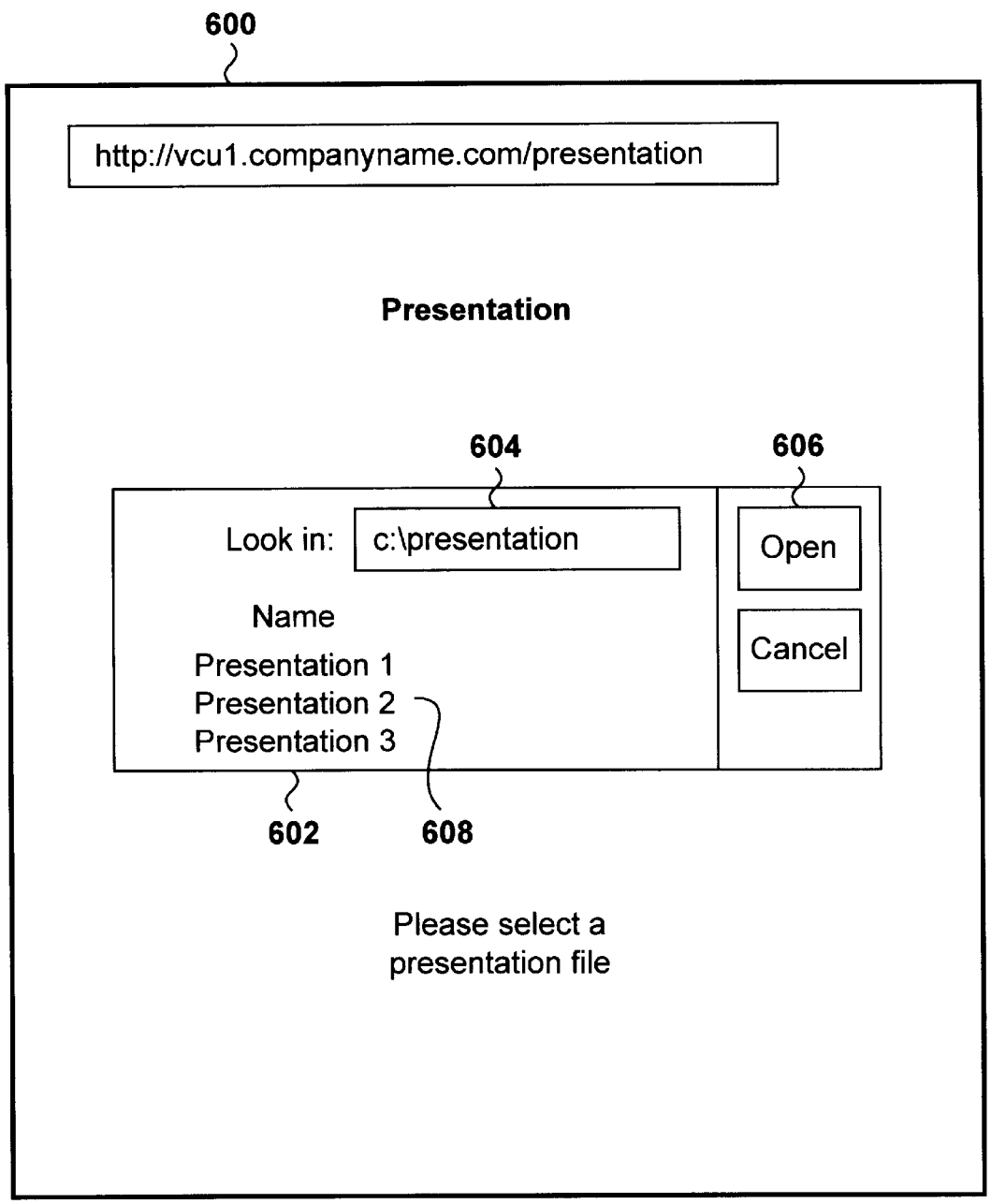
FIG. 6 is an exemplary web page displaying information relating to presentation selection.
Figure 8:
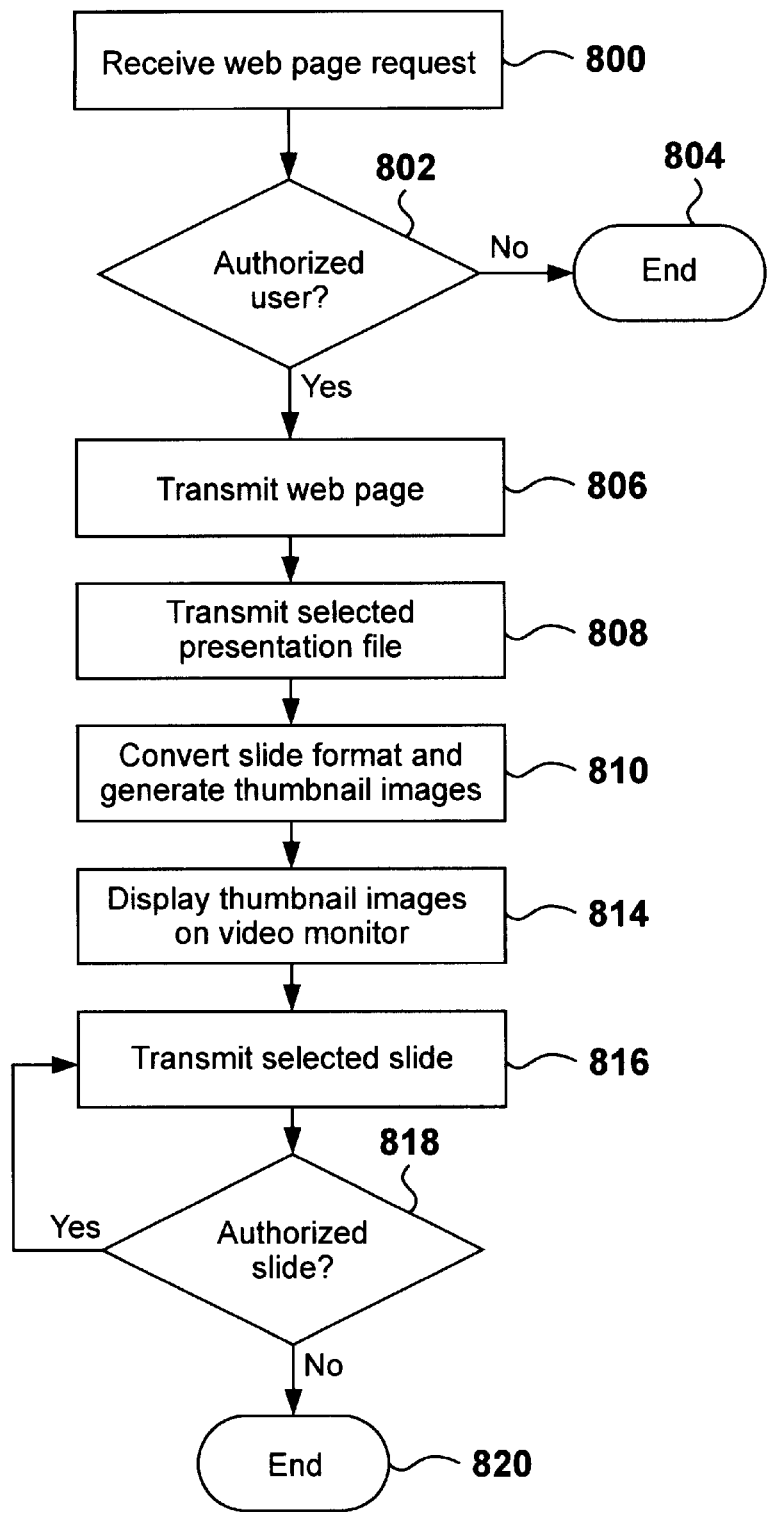
FIG. 8 is a flowchart showing steps of a method for selecting a presentation for distribution by the videoconferencing system.
Figure 9:
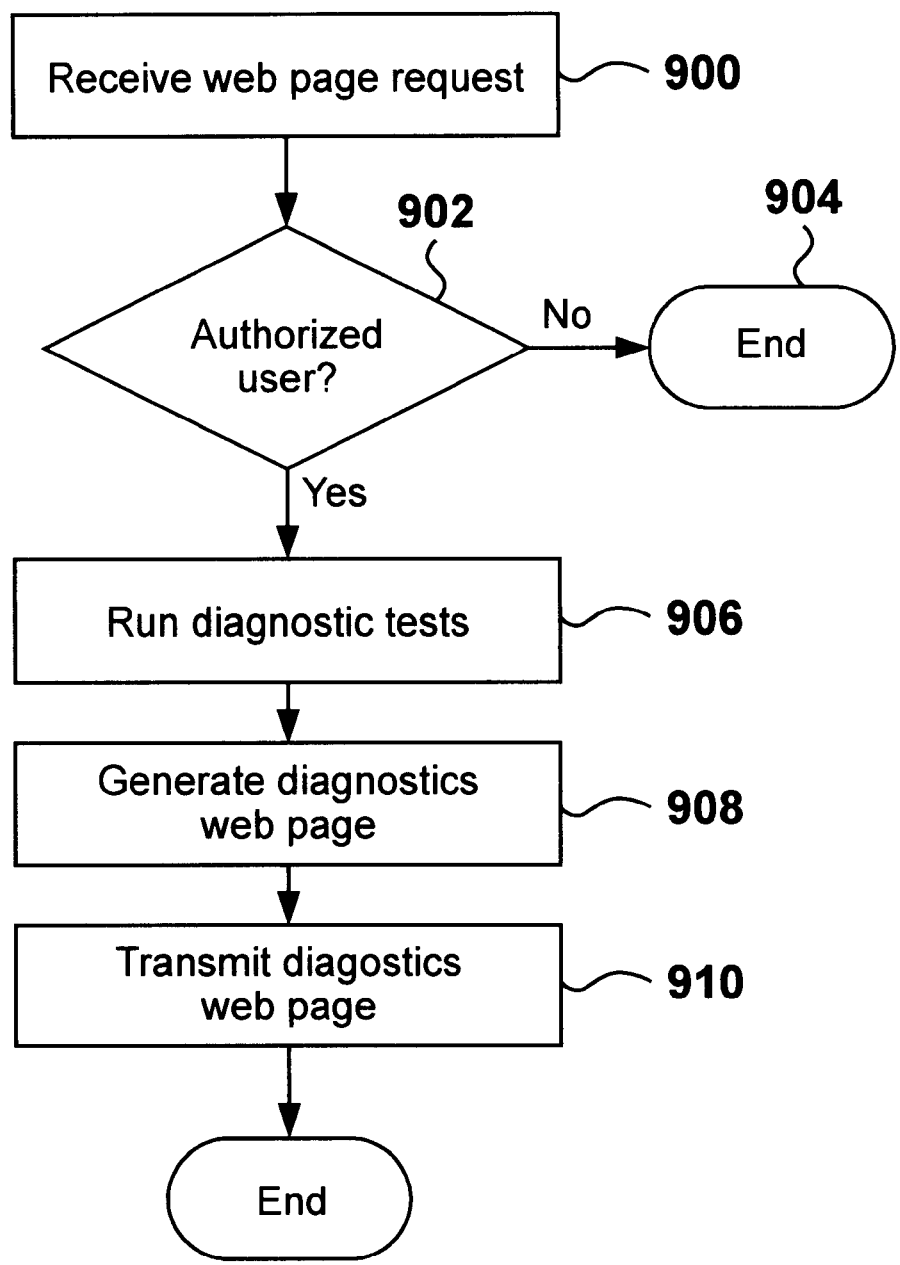
FIG. 9 is a flowchart depicting steps of a method for performing remote diagnosis of the videoconferencing system.

The operation of the web-enabled features of VCU 102 may best be understood with reference to the exemplary web pages depicted in FIGS. 4–6 and the flowcharts depicted in FIGS. 8 and 9. FIG. 4 depicts an exemplary home page 400 of VCU 102. A user of a remote PC, such as remote PC 304 connected to VCU 102 through LAN 130, accesses home page 400 by entering the URL of VCU 102 (e.g., http://vcu1.companyname.com) into location box 402 of a browser running on remote PC 304. The browser responsively sends a web page request to VCU 102 along LAN 130. The web page request is directed to web server 210, which in turn transmits home page 400 (encoded in HTML format) to remote PC 304. The browser receives and interprets home page 400 and causes it to be displayed to the user.

Home page 400 presents a set of options for further action by the user. The options are represented by text and/or graphics, and include embedded hypertext links referencing a corresponding web page. In the current example, home page 400 provides a "Select a presentation" option 404, a "View a presentation" option 406, and a "System information and management" option 408. As will be discussed in further detail below, linking to "Select a presentation" option 404 allows the remote user to select a presentation file (comprising a plurality of slides) for transmission by VCU 102 to remote conference endpoints 302. Linking to "View a presentation" option 406 allows the user of remote PC 304 to view presentation slides currently being transmitted by VCU 102. Finally, linking to "System information and management" option 408 allows the user to remotely perform tasks in connection with VCU 102 such as conference call placement and system diagnostics. This option is discussed below in connection with FIG. 5. The remote user conventionally selects a desired option by maneuvering the mouse pointer over the text and/or graphics representative of the desired option and clicking the mouse button.

FIG. 5 is an exemplary web page 500 corresponding to "System information and management" option 408. In practice, selection of "System information and management" option of home page 400 causes the browser to send a request for corresponding web page 500 to web server 210 of VCU 102, and web server 210 responsively transmits web page 500 in HTML encoded format. Web page 500 displays an additional set of more specific options, including a "Place phone call" option 502, a "System Diagnostics" option 504, and a "Set-Up and Configuration" option 506.

Selection of "place phone call" option 502 causes another web page to be retrieved from web server 210. This web page includes forms or dialog boxes wherein the user of remote PC 304 is prompted to enter call parameters, such as the telephone number(s) of remote conference endpoint 302 and the desired connection speed. The call parameters entered by the user are subsequently transmitted to VCU 102 and passed to conferencing application 206, which starts a conference call using the entered call parameters. "Place phone call" option 502 may thus be advantageously employed to remotely initiate and configure conference calls, thereby avoiding the need for the conference participants (who may have little or no familiarity with the operation of videoconferencing system 100) to do so themselves.

Selection of "System diagnostics" option 504 causes diagnostics/management module 204 to execute one or more tests of VCU 102 components to verify their operation and identify any problems. Upon completion of the one or more tests, web server 210 generates and transmits to remote PC 304 a web page displaying the test results. This option will be discussed further in connection with FIG. 9.

Finally, selection of "Set-up and configuration" option 506 causes diagnostics/management module 204 to determine current values of a specified set of configuration parameters. These configuration parameters may include the following: system name, country, ISDN numbers, ISDN switch, and auto-answer status. The values of the parameters are then passed to web server 210, which generates and transmits a web page displaying the parameter values. The web page may include forms or dialog boxes allowing the user to enter new configuration parameter values, which are subsequently conveyed to diagnostics/management module 204 and used to reconfigure VCU 102.

FIG. 6 is an exemplary web page 600 corresponding to "Select a presentation" option 404. As alluded to above, a user of a computer or device connected to VCU 102 over LAN 130, for example remote PC 306, may upload presentation files (typically in PowerPoint format) to VCU 102 for subsequent transmission to remote conference endpoints 302, as well as to other computers or devices connected to LAN 130 or Internet 312. Responsive to selection of "select a presentation" option 404, web server 210 transmits HTML-encoded web page 600, which includes a script or applet(s) for generating a presentation file selection window 602. The user selects a presentation by first specifying in box 604 the location of the presentation (for example, a folder on the hard drive of remote PC 306). Presentation file selection window 602 then displays names of presentation files 608 stored in the specified location. The user may then highlight the desired presentation file to select it and engage open button 606.

The selected presentation file, comprising a set of slides, is then transmitted to VCU 102 via LAN 130 (in accordance with a script or applet embedded in or referenced by web page 600). The presentation file is then directed to presentation engine 208, which converts the slides of the presentation to a set of thumbnail images encoded in suitable format. The encoded thumbnail images are then added to the video data stream supplied to video I/O interface 120 such that the thumbnail images are displayed on video monitor 110.

Figure 7:
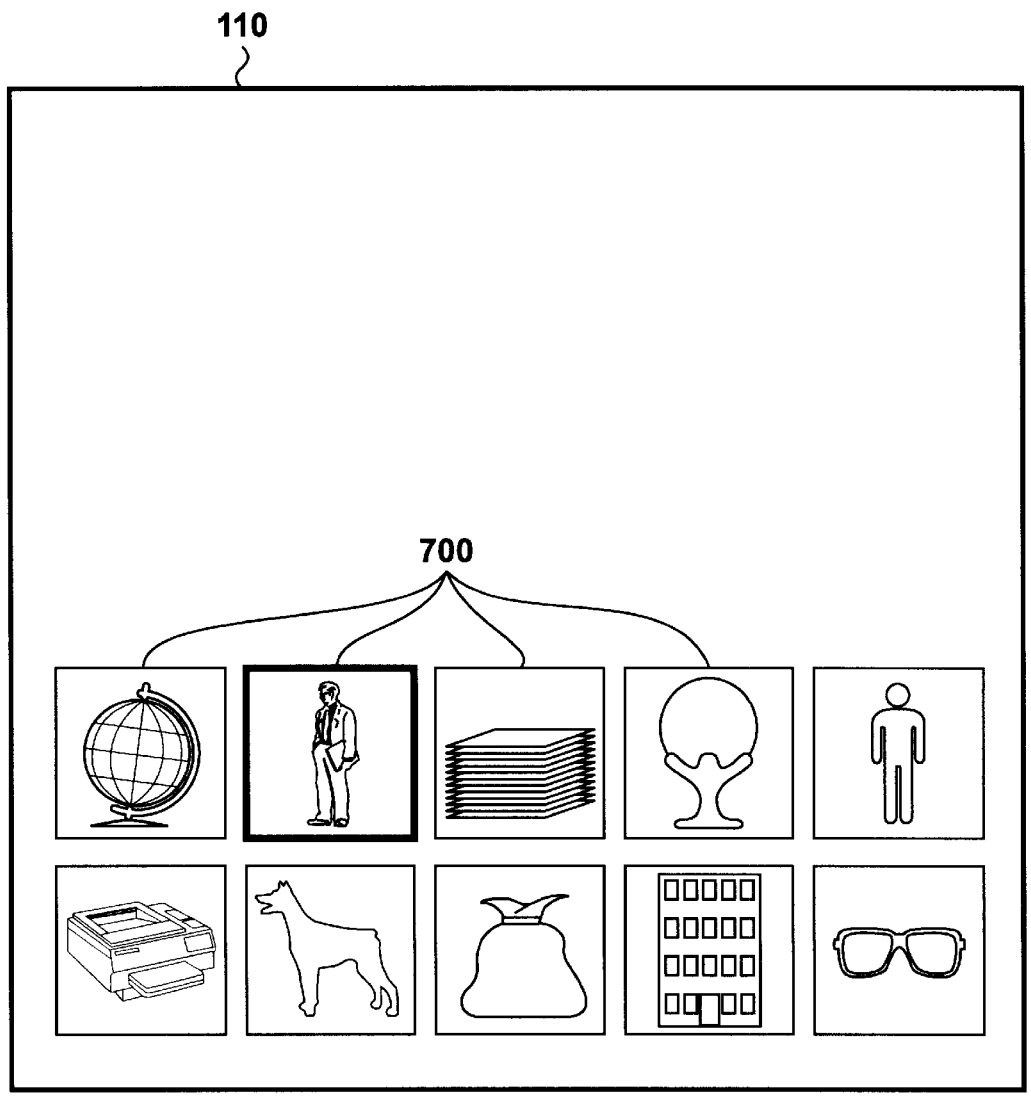
FIG. 7 depicts a set of thumbnail images from a presentation displayed on a video monitor of the videoconferencing system.

FIG. 7 depicts a set of exemplary thumbnail images 700 corresponding to presentation slides displayed on video monitor 110. A near videoconference participant may navigate through thumbnail images 700 by engaging user controls 134, such as the directional arrows on a remote control device. Upon selection of a particular thumbnail image 700, the participant may engage the "select" key on the remote control to cause the slide corresponding to the selected thumbnail image 700 to be transmitted by VCU to remote conference endpoints 302 for viewing by the remote conference participants.

FIG. 8 is a flowchart depicting the steps of a method for selecting presentations in accordance with the present invention. In step 800, a computer connected to VCU 102, for example remote PC 304, transmits a request for presentation page 600 to VCU 102. This request is initiated by the user clicking on "Select a presentation" option 404 of home page 400.

Next, web server 210, upon receipt of the web page request, performs an optional authentication step 802 wherein it is determined if the user requesting presentation page 600 is authorized to do so. This step may be performed by sending an authentication page having a dialog box prompting the user to enter a userid and/or a password. This information is then transmitted to web server 210, which checks the entered information against a list of authorized users. If it is determined that the user is not authorized to receive presentation page 600, the method ends, step 804.

If it is determined that the user is authorized, web server 210 transmits presentation page 600 to remote PC 304, step 806. As discussed above in connection with FIG. 6, presentation page 600 includes or references a script or applet which causes a presentation selection window 602 to appear within the browser window of remote PC 304. The user then identifies the location and file name of the selected presentation by entering the appropriate information into presentation selection window 602. The file containing the presentation may reside, for example, on the hard drive of remote PC 304.

When a presentation file has been identified, it is transmitted to VCU 102 and directed to presentation engine 208, step 808. Presentation engine 208 then extracts the component slides of the transmitted presentation file and generates thumbnail images, encoded in a suitable format, of each slide, step 810. The data encoding the thumbnail images is then inserted into the video data stream directed to video I/O interface 118, and the thumbnail images are accordingly displayed on video monitor 110, step 814. A near conference participant then selects a slide for transmission to remote conference endpoint 302 by navigating through the thumbnail images using user controls 134. Upon selection of a slide, presentation engine 208 causes conferencing application 206 to transmit the corresponding image to remote conference endpoint 302, step 816.

In step 818, it is determined if the near conference participant wishes to send another slide. If so, the method returns to step 816; if not, the method ends, step 820.

FIG. 9 depicts the steps of a method for remotely initiating diagnostic tests of VCU 102. In step 900, a computer connected to VCU 102, for example remote PC 304, transmits a request for a diagnostics web page to VCU 102. This request is initiated by the user clicking on "System diagnostics" option 504 of system information and management page 500.

Next, web server 210, upon receipt of the web page request, performs an optional authentication step 902 as described above in connection with the FIG. 8 method. If it is determined that the user is not authorized to receive presentation page 600, the method ends, step 904.

If it is determined in step 902 that the user is authorized, diagnostics/management module 204 is caused to perform a set of diagnostic tests to check the operation of VCU 102 and identify any operational problems, step 906. Examples of tests performed by diagnostics/management module 204 include testing of the audio components, near end communication loop, and far end communication loop. The test results obtained by diagnostics/management module 204 are then passed to web server 210, which generates a diagnostics web page incorporating the test results, step 908. The diagnostics web page is then transmitted to remote PC 304, step 910. The method then ends, step 912.

It is appreciated that other techniques may be utilized to remotely manage VCU 102. For example, a Simple Network Management Protocol (SNMP) agent may be installed at VCU 102 and configured to provide notification to a system administrator located on LAN 130 upon the occurrence of certian events, such as a malfunction of VCU 102. Other network-based methods for remotely managing VCU 102 through LAN 130 may occur to those of ordinary skill in the art and are considered to be within the scope of the present invention.

Examples set forth above describe accessing web pages 212 through browsers running on remote PCs 306 and 308 connected to VCU 102 via LAN 130 and Internet 312. However, it is to be appreciated that web pages 212 may also be accessed and the corresponding functions performed through a browser running on local PC 132, even in the absence of a connection between VCU 102 and LAN 130.

It will be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment and for particular applications, e.g., videoconferencing applications, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

What is claimed is:

1. A videoconferencing system comprising:
a videoconferencing unit having a conferencing application for processing locally generated audio and video data for transmission to a remote conference endpoint, and for processing remotely generated audio and video data received from the remote conference endpoint;
a network interface for connecting the videoconferencing unit to a computer network; and
a web server embedded within the videoconferencing unit and coupled to the network interface, for transmitting selected web pages responsive to requests received over the network from remote devices;
wherein the web pages include a presentation selection web page including embedded instructions for requesting user identification of a presentation file, retrieving the identified presentation file from a specified location, and transmitting the presentation file to the videoconferencing unit over the computer network.

2. The videoconferencing system of claim 1, wherein the videoconferencing unit include a presentation engine for converting the set of presentation slides of the presentation file to a corresponding set of thumbnail images for display on a video monitor connected to the videoconferencing unit.

3. The videoconferencing system of claim 2, wherein the presentation engine is further configured to cause images representative of selected ones of the presentation slides to be transmitted to the remote conference endpoint.

4. The videoconferencing system of claim 1 wherein the presentation file includes a set of presentation slides.

5. The videoconferencing system of claim 1 wherein the presentation file includes streaming video files.

6. A videoconferencing system comprising:
a videoconferencing unit having a conferencing application for processing locally generated audio and video data for transmission to a remote conference endpoint and for processing remotely generated audio and video data received from the remote conference endpoint;
a network interface for connecting the videoconferencing unit to a computer network; and
a web server embedded within the videoconferencing unit and coupled to the network interface, or transmitting selected web pages responsive to requests received over the network from remote devices;
wherein the web pages include web pages having embedded instructions for initiating diagnostic testing of the videoconferencing unit and for displaying test results.

7. A videoconferencing system comprising:
a videoconferencing unit having a conferencing application for processing locally generated audio and video data for transmission to a remote conference endpoint, and for processing remotely generated audio and video data received from the remote conference endpoint;
a network interface for connecting the videoconferencing unit to a computer network; and
a web server embedded within the videoconferencing unit and coupled to the network interface, for transmitting selected web pages responsive to requests received over the network from remote devices;
wherein the web pages include configuration pages having embedded instructions for displaying and changing configuration parameters of the videoconferencing unit.

8. The videoconferencing system of claim 7, further comprising a user control interface operative to enable entry of user input to the videoconferencing unit, the user control interface further operative to receive configuration information, wherein the videoconferencing system can be configured using either the user control interface or the web server configuration pages.

9. The videoconferencing system of claim 8, further comprising a remote control unit operative to transmit user inputs to the user control interface.

10. The videoconferencing system of claim 8, wherein the user control interface comprises a graphical user interface.

11. A method for operating a videoconferencing system having a network interface for connecting the videoconferencing system to a compute network, the method comprising the steps of:
generating local audio and video data transmitting the local audio and video data to a remote conference endpoint;
receiving remote audio and video data from the remote conference endpoint, and
processing the remote audio and video data for local presentation thereof;
generating web pages with a web server embedded in a videoconferencing unit of the videoconferencing system in response to page requests received from remote devices connected to the computer network;
transmitting the web pages over the computer network;
wherein the step of transmitting web pages includes transmitting a presentation selection web page having instructions for;
requesting user input identifying a presentation file having a set of presentation slides;
retrieving the presentation file from a specified location; and
transmitting the presentation file to the videoconferencing system.

12. The method of claim 11, further comprising the steps of:
receiving the presentation file at the videoconferencing system;
converting the set of slides to a corresponding set of thumbnail images; and
displaying the set of thumbnail images on a video monitor associated with the videoconferencing system.

13. The method of claim 12, further comprising the steps of:
receiving user input indicative of a selected slide; and
transmitting an image representative of the selected slide to the remote conference endpoint.

14. A method for operating a videoconferencing system having a network interface for connecting the videoconferencing system to a compute network, the method comprising the steps of:
generating local audio and video data transmitting the local audio and video data to a remote conference endpoint;

receiving remote audio and video data from the remote conference endpoint, and processing the remote audio and video data for local presentation thereof;

generating web pages with a web server embedded in a videoconferencing unit of the videoconferencing system in response to page requests received from remote devices connected to the computer network;

transmitting the web pages over the computer network; and performing diagnostic testing of the videoconferencing system, wherein the step of transmitting web pages includes transmitting a web page displaying test results.

15. A method for operating a videoconferencing system having a network interface for connecting the videoconferencing system to a compute network, the method comprising the steps of:

generating local audio and video data transmitting the local audio and video data to a remote conference endpoint;

receiving remote audio and video data from the remote conference endpoint, and processing the remote audio and video data for local presentation thereof;

generating web pages with a web server embedded in a videoconferencing unit of the videoconferencing system in response to page requests received from remote devices connected to the computer network; and transmitting the web pages over the computer network; wherein the step of transmitting web pages includes transmitting configuration web pages having instructions for displaying configuration parameters and for changing selected ones of the configuration parameters of the video conferencing system in accordance with user input.

16. A videoconferencing system comprising:

a videoconferencing unit including means for connecting the videoconferencing system to a computer network;

means for generating local audio and video data transmitting the local audio and video data to a remote conference endpoint;

means for receiving remote audio and video data from the remote conference endpoint, and processing the remote audio and video data for local presentation thereof;

means for generating web pages from within the videoconferencing unit in response to page requests received from remote devices connected to the computer network; and means for transmitting the web pages over the computer network responsive to page requests received from remote devices connected to the computer network;

wherein the means for transmitting web pages includes a means for transmitting a presentation selection web page having instructions for:

requesting user input identifying a presentation file having a set of presentation slides;

retrieving the presentation file from a specified location; and transmitting the presentation file to the videoconferencing system.

17. The videoconferencing system of claim 16 wherein the presentation file includes a set of presentation slides.

18. The videoconferencing system of claim 17, further comprising:

a means for receiving the presentation file at the videoconferencing system;

a means for converting the set of slides to a corresponding set of thumbnail images; and a means for displaying the set of thumbnail images on a video monitor associated with the videoconferencing system.

19. The videoconferencing system of claim 18, further comprising:

a means for receiving user input indicative of a selected slide; and a means for transmitting an image representative of the selected slide to the remote conference endpoint.

20. The videoconferencing system of claim 16, further comprising a means for performing diagnostic testing of the videoconferencing system, wherein the means for transmitting web pages includes a means for transmitting a web page displaying test results.

21. The videoconferencing system of claim 16, wherein the means for transmitting web pages includes a means for transmitting configuration web pages having instructions for displaying configuration parameters and a means for changing selected ones of the configuration parameters of the videoconferencing device in accordance with user input.

* * * * *